United States Patent [19]
Wakabayashi et al.

[11] Patent Number: 5,515,128
[45] Date of Patent: May 7, 1996

[54] DISPLAY SYSTEM FOR A CAMERA

[75] Inventors: Hiroshi Wakabayashi, Yokohama; Daiki Tsukahara, Hiratsuka, both of Japan

[73] Assignee: Nikon Corporation, Tokyo, Japan

[21] Appl. No.: 304,176

[22] Filed: Sep. 12, 1994

[30] Foreign Application Priority Data

Sep. 24, 1993 [JP] Japan .................... 5-237884

[51] Int. Cl.$^6$ ................................. G03B 17/18
[52] U.S. Cl. ........................................ 354/289.12
[58] Field of Search ...................... 354/470, 471, 354/474, 469, 289.12, 238.1; 340/815.78

[56] References Cited

U.S. PATENT DOCUMENTS

| | | | |
|---|---|---|---|
| 2,351,978 | 6/1944 | Kuppenbender | 354/470 |
| 2,992,600 | 7/1961 | Rentschler | 354/435 |
| 4,090,207 | 5/1978 | Mashimo et al. | 354/23 |
| 4,118,726 | 10/1978 | Kuramoto et al. | 354/289.1 |
| 4,168,898 | 9/1979 | Orban | 354/289 |
| 4,837,596 | 6/1989 | Kawamura | 354/442 |
| 5,148,204 | 9/1992 | Umetsu et al. | 354/195.1 |
| 5,235,380 | 8/1993 | Yamada et al. | 354/471 |
| 5,365,292 | 11/1994 | Wakabayashi et al. | 354/76 |

*Primary Examiner*—Michael L. Gellner
*Assistant Examiner*—John Chizmar
*Attorney, Agent, or Firm*—Oliff & Berridge

[57] ABSTRACT

This display system for a camera includes a plurality of display devices which mutually differ with regard to their display delay time periods as taken from when the information which they are to display is input to them until this information is actually displayed by them, and a controller which outputs information to be displayed to this plurality of display devices sequentially in ascending order of their display delay time periods.

11 Claims, 8 Drawing Sheets

DISPLAY SYSTEM FOR A CAMERA

BACKGROUND OF THE INVENTION

1. Field of the Invention

The present invention relates to a display system for a camera which can display information by rotationally driving an indicator pointer over a scale plate.

2. Description of the Related Art

A display apparatus for a camera which is capable of displaying information by rotationally driving an indicator pointer over a scale plate is per se known. With such a type of display apparatus there are typically provided separate rotating indicator pointer type display devices, each for displaying a particular item of information related to photography, such as iris aperture, photographic distance, film frame number and the like; and each of these display devices includes a rotating indicator pointer which is rotated by the operation of a stepper motor so as to display the corresponding item of information. Further, there is typically provided within the viewfinder of the camera a liquid crystal type display device which displays shutter speed and the like, and it is possible for the photographer to be apprised of such information simply by peeking through the viewfinder and looking at the liquid crystal type display device.

However, the information which is required to be displayed upon a liquid crystal display device is transmitted to the display device in the form of drive signals for the various segments thereof, and those of the segments to which drive signals are supplied for turning them on are turned on with hardly any time delay, whereby the information is displayed as required almost instantaneously. On the other hand, with a display device of the rotating indicator pointer type, the information which is required to be displayed is transmitted to the display device in the form of a pulse signal for rotationally driving the stepper motor for the indicator pointer thereof according to the number of pulses which this pulse signal contains, and the indicator pointer is rotated according to the number of pulses in this input pulse signal, so as to display the required information. Accordingly, in comparison with a liquid crystal type display device, such a rotating indicator pointer display device suffers from a certain time delay in displaying the required information, this time delay being the time period which is required for the indicator pointer to rotate from its initial position to a position appropriate to indicate the current value of the required information. Moreover, a liquid crystal type display device can be termed a display device of the so called electrical type, while by contrast a rotating indicator pointer display device can be termed a display device of the so called mechanical type.

These types of display device are usually controlled with a microcomputer, and the information which is to be displayed is output from the microcomputer to the display device in a previously determined upon order and format. However, since with a display apparatus for a camera according to the prior art no account was taken when performing display control of the delay time periods inherent in the operation of the various types of display device, therefore in displaying information simultaneously both upon a liquid crystal type display device and also upon a rotating indicator pointer display device the problem arose that, when the information which was to be displayed was output to the rotating indicator pointer display device before it was output to the liquid crystal type display device, it took a certain time period to output the pulse signal representing the display information to the rotating indicator pointer display device, and until the output of this pulse signal was completed it was not possible even to start to output the control signal for the liquid crystal type display device. Therefore, display of the information which was to be displayed upon the liquid crystal type display device was delayed by the full time period required for the indicator pointer of the rotating indicator pointer display device to be rotated to its position to display the information required to be displayed thereby.

SUMMARY OF THE INVENTION

The objective of the present invention is to provide a display system for a camera, capable of quickly displaying information upon a plurality of display devices which have different characteristic delay time periods.

In order to attain this objective, the present invention proposes a display system for a camera, comprising: a plurality of display devices which mutually differ with regard to their display delay time periods as taken from when the information which they are to display is input to them until this information is actually displayed by them; and a controller which outputs information to be displayed to said plurality of display devices sequentially in ascending order of their display delay time periods.

According to the present invention as defined above, among the plurality of display devices which mutually differ with regard to their display delay time periods, the information to be displayed is first output to that one of the display devices which has the shortest display delay time period—for example, to a one of these display devices which is an electrical type display device; and afterwards the information to be displayed is output to those of the display devices which have longer display delay time periods—for example, to a one of these display devices which is a mechanical type display device.

By doing this, information is displayed almost instantaneously upon the electrical type display device which is the one with the shortest display delay time period, while on the other hand, even though the display information is output subsequently upon the mechanical type display device which is the one with a longer display delay time period, and for which basically the display delay time period is longer, nevertheless no bad feeling is occasioned to the user of the camera, and as a whole information is displayed more quickly upon this plurality of display devices having mutually different display delay time periods.

DETAILED DESCRIPTION OF THE PREFERRED EMBODIMENTS

The preferred embodiments of the display system for a camera according to the present invention will now be explained with reference to the figures.

Preferred Embodiment 1

Figure 1:
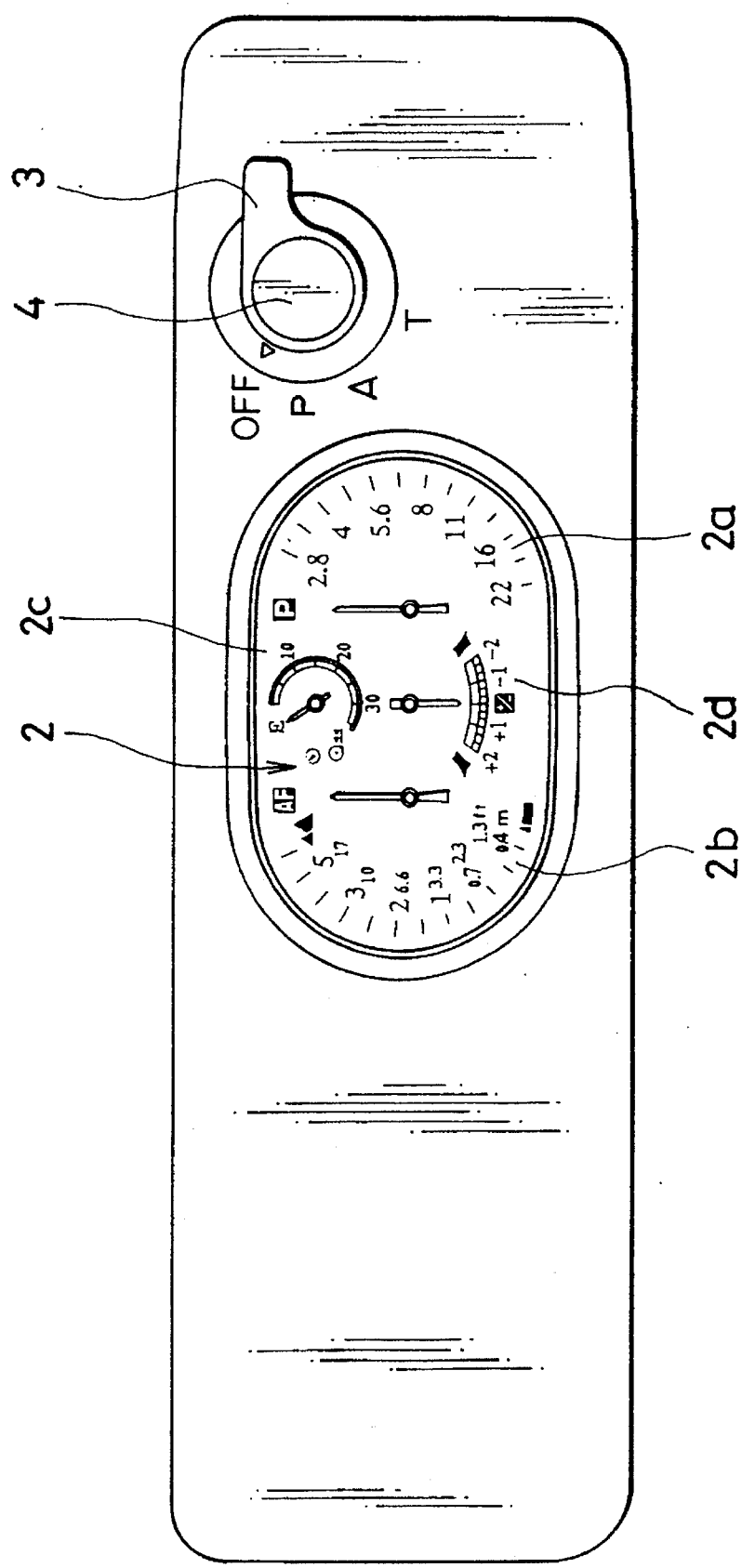
FIG. 1 is a plan view of a camera which is equipped with a first preferred embodiment of the display system according to the present invention.
Figure 2:
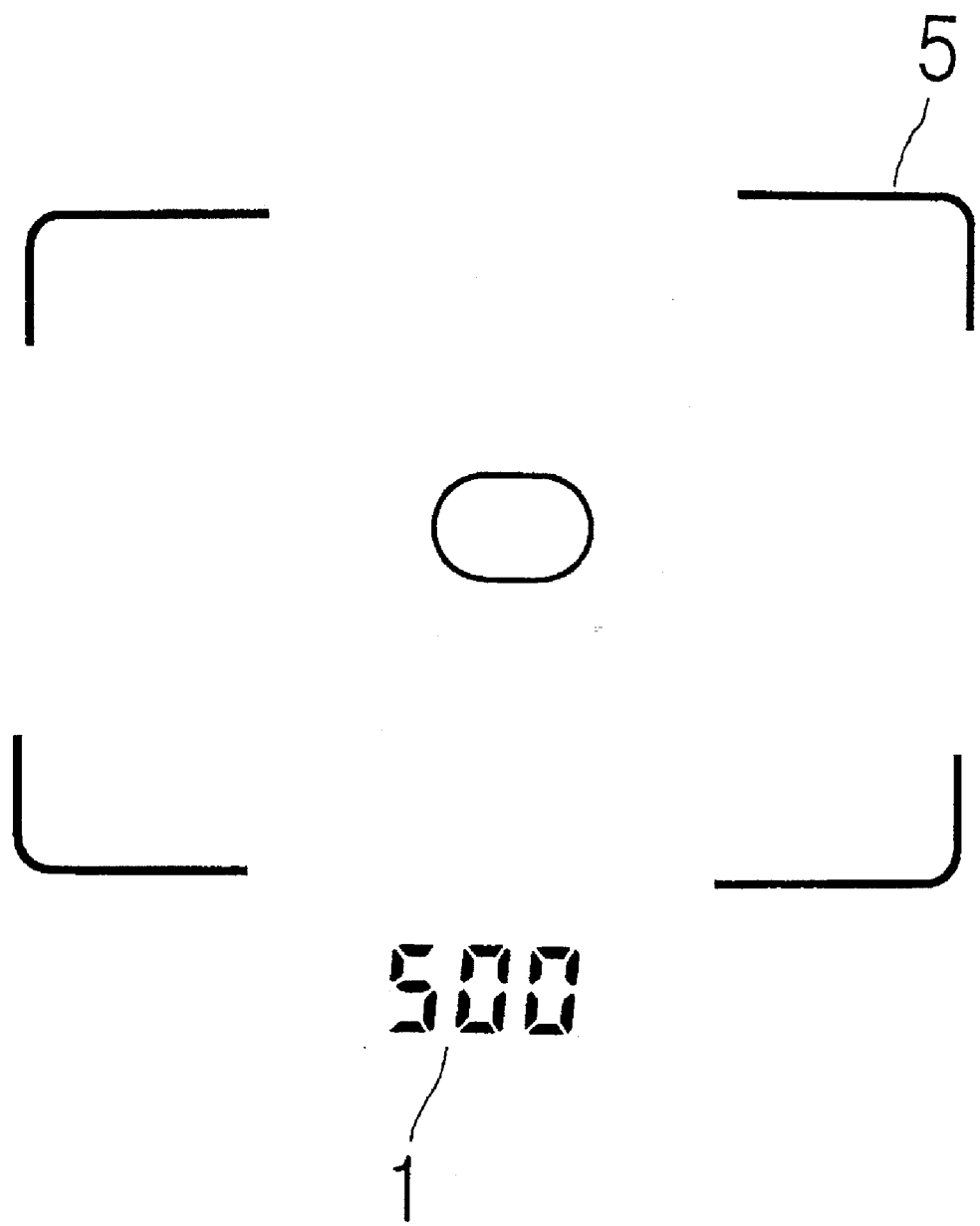
FIG. 2 is a view showing a display device provided within the viewfinder of the camera of FIG. 1.
Figure 3:
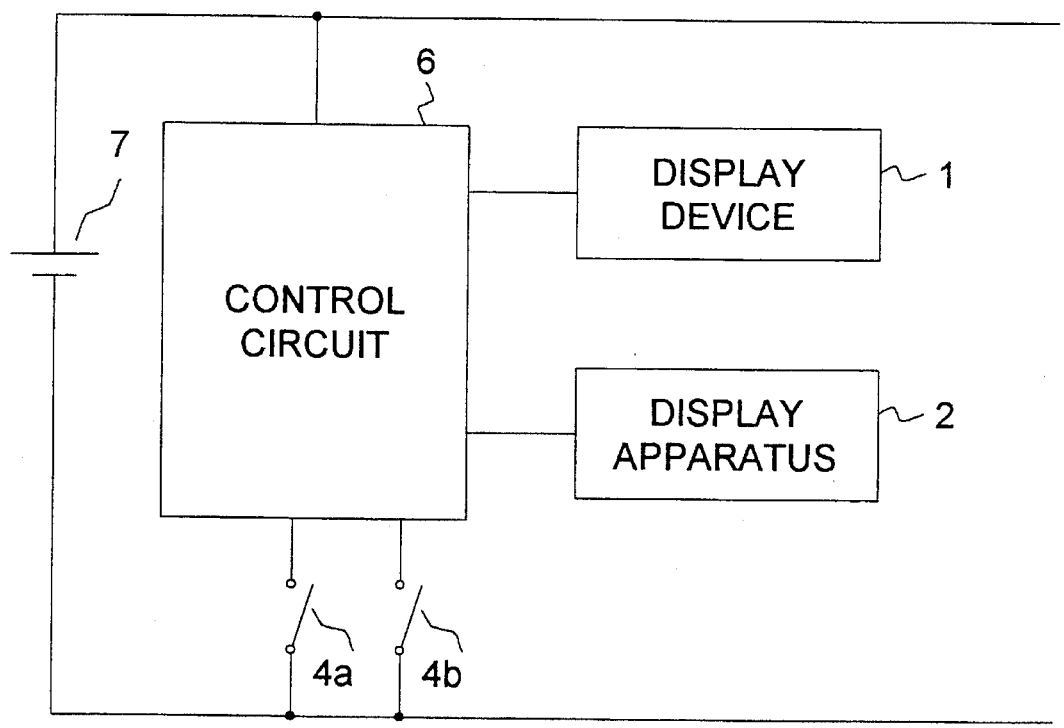
FIG. 3 is a block diagram showing the overall construction of the first preferred embodiment.

FIG. 1 is a plan view of a camera which is equipped with the first preferred embodiment of the display system according to the present invention, while FIG. 2 is a view showing a display device provided within the viewfinder of the camera of FIG. 1 and FIG. 3 is a block diagram showing the overall construction of this first preferred embodiment.

Figure 5:
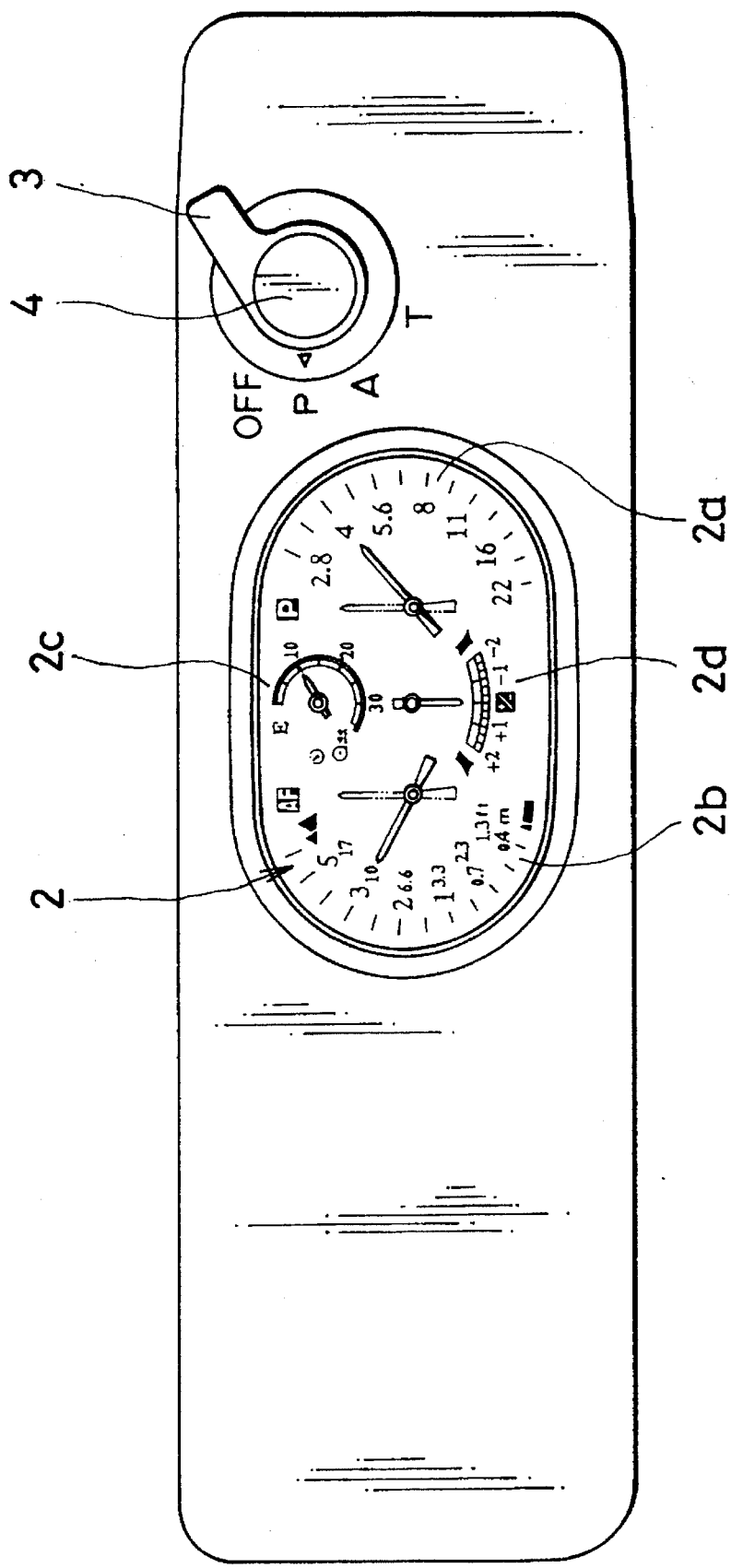
FIG. 5 is a figure similar to FIG. 1, showing an exemplary display being provided upon the first preferred embodiment of the display system according to the present invention.

A display device 1 which is provided within the viewfinder of the camera, and which displays the shutter speed and the like, is constituted as a liquid crystal type display device and is made up from a number of display elements, and, as shown in FIG. 5, is located so as to appear to the photographer in the central part of the lower edge portion of the visual field, below the lower edge of a sighting frame 5. In FIG. 2 this viewfinder display device 1 is shown, by way of example, as displaying the shutter speed 1/500. On the other hand, a rotating indicator pointer type display apparatus 2 provided on the upper surface of the camera body (refer to FIG. 1) comprises an iris aperture display section 2a, a photographic distance display section 2b, a film frame counter 2c, and an exposure compensation display section 2d, and each of these display sections comprises a rotating indicator pointer and a scale plate which is inscribed with a scale. Furthermore, each of these rotating indicator pointers is coupled to a corresponding stepper motor therefor, not particularly shown in the figures, so as to be rotated about an axis near one of its ends according to drive control of this stepper motor, which is performed by a corresponding drive control circuit also not particularly shown. And on the upper surface of the camera main body there is further provided a mode selector 3 which can be rotated by the actuation of a projecting portion thereof to any one of four positions which denote four respectively corresponding operational modes: an "OFF" position in which all of the operations of the camera are suspended, a "P" position which denotes a programmed automatic exposure mode, an "A" position which denotes an aperture priority automatic exposure mode, and a "T" position which denotes a shutter priority automatic exposure mode. A release button 4 for initiating photography is also provided at the center of the mode selector 3.

Referring now to FIG. 3, the switches 4a and 4b are switches which are turned on and off as the release button 4 is operated: the switch 4a is closed (turned on) when the release button 4 is depressed as far as a first stroke thereof, while the switch 4b is closed (turned on) when the release button 4 is depressed all the way through a second stroke thereof. These switches 4a and 4b are both connected to a control circuit 6, which comprises a microcomputer and various associated circuitry (not particularly shown) and which, along with dealing with overall sequence control for the camera and performing various calculations, also executes a control program which will be described in detail hereinafter for controlling the viewfinder display device 1 and the rotating indicator pointer type display apparatus 2 according to the operation of the mode selector 3 and of the release button 4. A battery 7 supplies operating power to the control circuit 6, to the display device 1, and to the display apparatus 2.

When the mode selector 3 is set to its "OFF" position, then as shown in FIG. 1 all of the indicator pointers of all of the display sections 2a through 2d of the rotating indicator pointer display apparatus 2 are rotated by their respective stepper motors to their respective home positions, and all of the operations of the camera are suspended. At this time, moreover, the operation of the viewfinder display device 1 is stopped.

Figure 4:
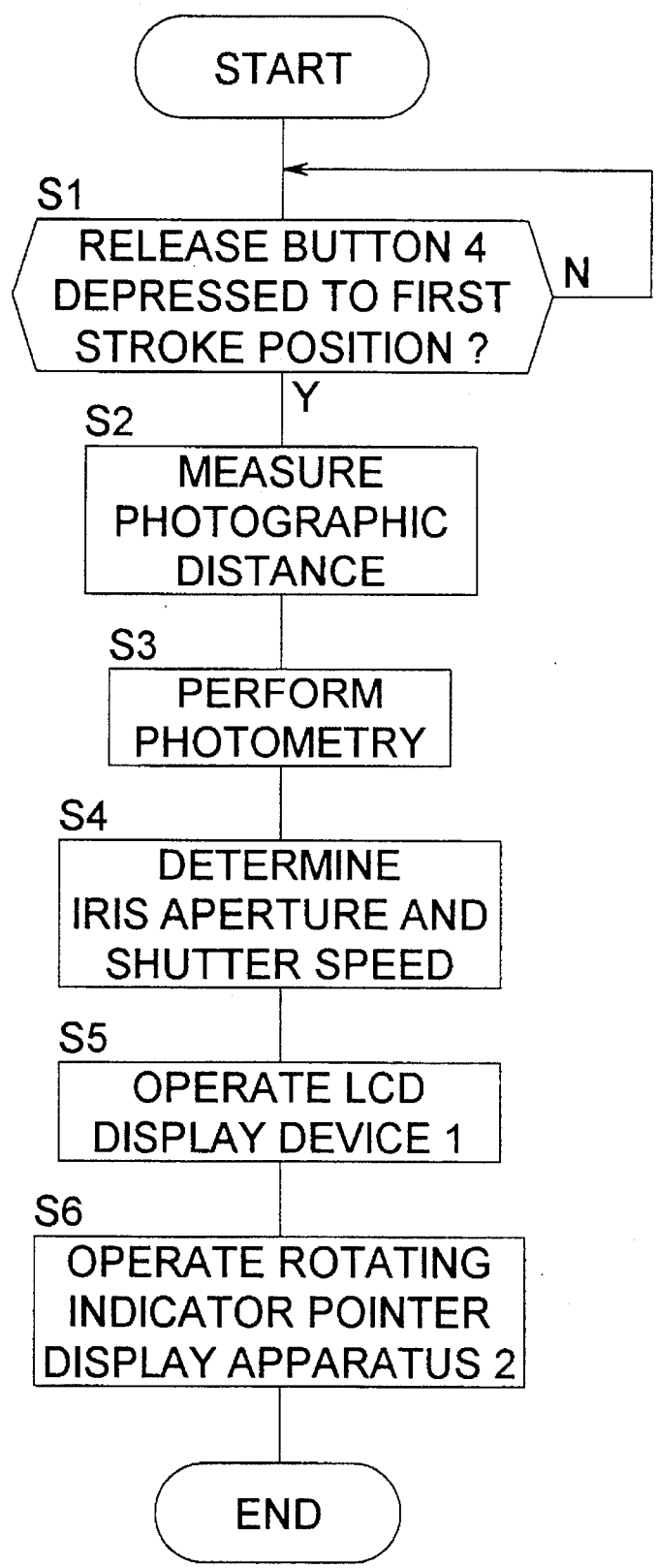
FIG. 4 is a flow chart showing the operation of a display control program for the first preferred embodiment.

When on the other hand the mode selector 3 is set to any one of its "P" position, its "A" position, or its "T" position, then the camera is put into its operational state in which it is capable of performing photography, and the microcomputer incorporated in the control circuit 6 starts to execute the control program whose flow chart is shown in FIG. 4. This control program will now be explained with reference to this flow chart.

In the step S1, a decision is made, based upon the output from the switch 4a, as to whether or not the release button 4 has been depressed as far as its first stroke position, and if the release button 4 has thus been depressed to its first stroke position then the flow of control continues to the step S2, while if not the flow of control is returned back to this step S1, to loop until the release button 4 is thus depressed. In the step S2, the distance to the object to be photographed is measured by the control circuit 6 actuating a distance measurement device which is not particularly shown in the figures, and then in the next step S3 the brightness of the object to be photographed is measured by the control circuit 6 actuating a photometric device which is also not particularly shown. And, in the step S4, the control circuit 6 then determines an appropriate iris aperture and shutter speed for performing photography, based upon the brightness measured in the step S3, and according to one or the other of a programmed automatic exposure algorithm, an aperture priority automatic exposure algorithm, or a shutter priority automatic exposure algorithm, as determined by the currently set position of the mode selector 3.

Since as described above the display device 1 which is provided within the viewfinder is a liquid crystal type which is built up of liquid crystal elements, it is a display device of a type which displays information electrically, and, after the information which is to be displayed by this display device 1 is input thereto, it completes setting up the display of this information almost simultaneously, i.e. with almost no time delay. On the other hand, since the rotating indicator pointer type display apparatus 2 provided on the upper surface of the camera body displays information by rotationally driving indicator pointers over scale plates by stepper motors, it is a display apparatus of a type which displays information mechanically, and this display apparatus 2 takes a certain time from when the information to be displayed is input until it has completed the setting up of the display of this information. In this first preferred embodiment of the present invention, since photometry is performed after measuring the photographic distance, of all of the information which needs to displayed, the photographic distance information is available first, and the exposure information consisting of the iris aperture and the shutter speed becomes available afterwards. However, without any dependence upon this order in which the information which is to be displayed actually becomes available, first the shutter speed information which is to be displayed upon the viewfinder display device 1 which has hardly any display delay time period is output thereto for display, and subsequently the photographic distance information and so on are output to the rotating indicator pointer type display apparatus 2 for display.

In the step S5 of the FIG. 4 flow chart, a signal representing the value of the shutter speed is output to the LCD display device 1 provided within the viewfinder, so that as shown in FIG. 2 the shutter speed value is displayed thereupon, substantially instantaneously. Next, in the step S6, signals representing the values of the iris aperture, the photographic distance, the frame count, and the exposure correction value are output to the rotating indicator pointer type display apparatus 2, so that as shown in FIG. 5 the values of these parameters are displayed upon the respective display sections 2a through 2d thereof, which takes a certain time period.

Figure 6:
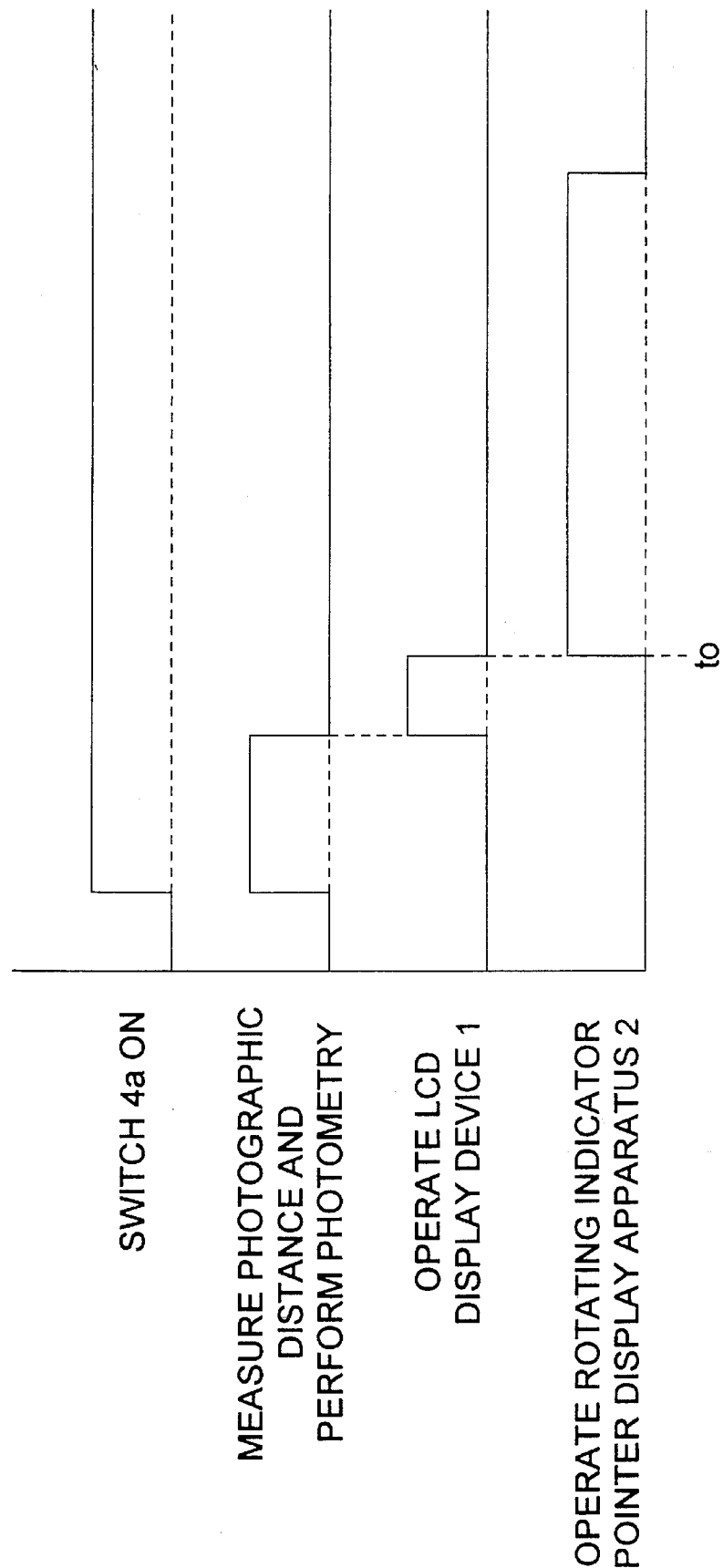
FIG. 6 is a timing chart showing the operation of the various display devices included in the first preferred embodiment.

FIG. 6 is a timing chart showing the operation of the viewfinder display device 1 and the rotating indicator pointer type display apparatus 2. When the release button 4 is depressed as far as its first stroke position so that the switch 4a is turned on, the photographic distance is measured (in the step S2 of the FIG. 4 flow chart) and photometry is performed (in the step S3), and then the exposure calculations are performed substantially instantaneously upon the time scale of the FIG. 7 timing chart (in the step S4). Next the viewfinder display device 1 is operated so as to display the shutter speed. And after this the rotating indicator pointer type display apparatus 2 is operated so as to display the photographic distance and so on.

Figure 7:
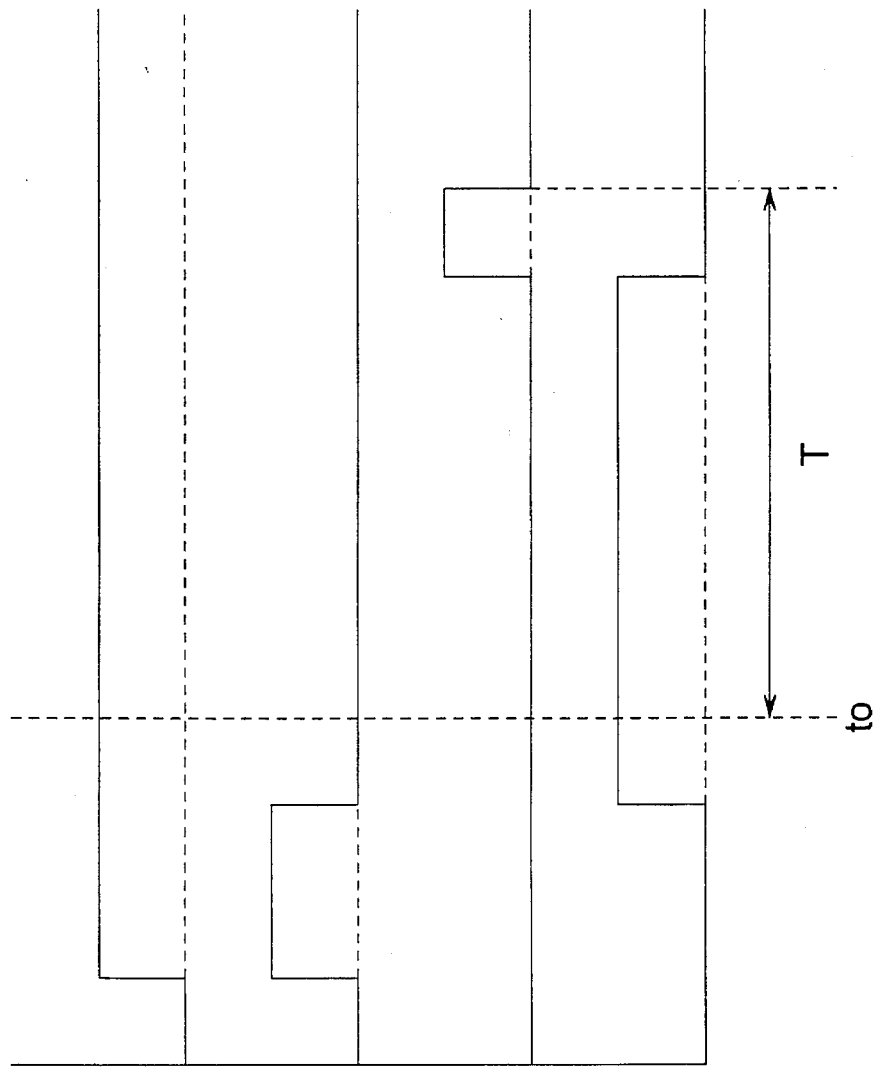
FIG. 7 is a timing chart showing the timing of the operation in the hypothetical case (not according to the present invention) that the various display devices were operated not in the ascending order of their various differing characteristic delay time periods.

On the other hand, FIG. 7 is a timing chart for the hypothetical case, not according to the principle of the present invention, in which the order of operating the viewfinder display device 1 and the rotating indicator pointer type display apparatus 2 to display information upon them is reversed. After measuring the photographic distance, performing photometry, and performing the exposure calculations, the rotating indicator pointer type display apparatus 2 is operated so as to display the photographic distance information and so on, and after this the viewfinder display device 1 is operated so as to display the shutter speed. In this case, however, the display of the shutter speed upon the viewfinder display device 1 is delayed by a time interval T, as compared to the case of the first preferred embodiment of the present invention as shown in FIG. 6.

In this manner, since the construction is so arranged that the display information is output in ascending order according to the characteristic time periods of the display devices, i.e. starting first by outputting information to that one, from among the plurality of display devices which have mutually different display delay time periods, for which the display delay time period is the shortest, thereby the information is displayed almost instantaneously upon that one of the display devices which operates electrically and which has the shortest display delay time period, while on the other hand no particular irritation is caused for the user of the camera in the case of the mechanical type display devices for which the characteristic display delay time periods are longer, even though the display information is output to them subsequently, since their basic display delay time periods are relatively long in any case.

Further, since, along with providing the liquid crystal type display device within the viewfinder which is an electrical type display device, the rotating indicator pointer type display apparatus is provided which is a mechanical type display device, thereby the information which is particularly necessary when taking a photograph can be easily checked while looking through the viewfinder by looking at the liquid crystal display device visible within the viewfinder, while on the other hand the more detailed information related to photography can be checked by looking at the rotating indicator pointer type display apparatus. Normally, the display of information by the rotating indicator pointer type display apparatus is able to proceed to completion while the camera user is removing the eye from the viewfinder and while he is displacing his gaze to the rotating indicator pointer type display apparatus, and therefore absolutely no problem arises from the fact that the display information is output to the rotating indicator pointer type display apparatus only after the display information is output to the liquid crystal display device.

Preferred Embodiment 2

Figure 8:
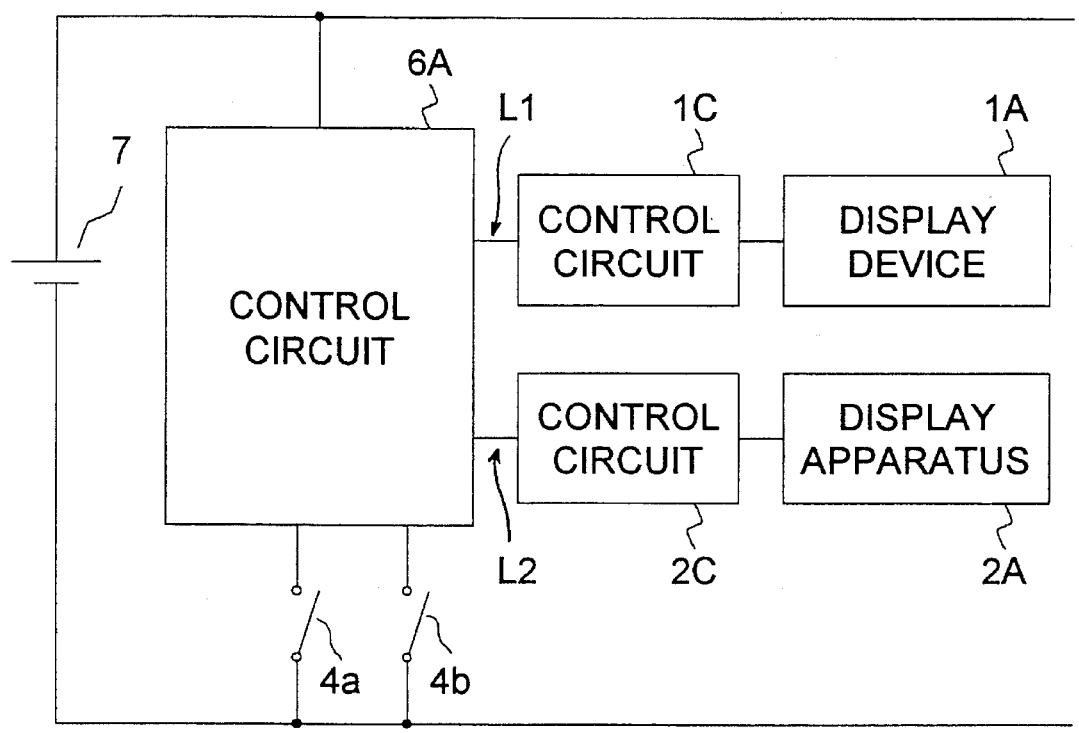
FIG. 8 is a block diagram showing the overall construction of a second preferred embodiment of the present invention.

FIG. 8 is a block diagram showing the overall construction of the second preferred embodiment of the present invention. To constructional elements in FIG. 8 which correspond to ones shown in FIG. 3 the identical reference symbols are appended, and the explanation will focus upon the points of difference. A control circuit 1C controls a display device 1A, while another control circuit 2C controls another display device 2A. When the display device 1A is to be driven, display information is transmitted to the control circuit 1C from the control circuit 6A via the line L1, and this information is displayed on the display device 1A by the control circuit 1C. On the other hand, when the display device 2A is to be driven, display information is transmitted to the control circuit 2C from the control circuit 6A via the line L2, and this information is displayed on the display device 2A by the control circuit 2C.

Let it be supposed that the operating time period for the control circuit 2C is longer than the operating time period for the control circuit 1C, and also that the data transmission via the line L2 takes longer than does data transmission via the line L1. Further, let it be supposed that the display delay time periods for the display device 1A and for the display device 2A are almost the same.

It is also possible to apply the present invention in these circumstances. To wit, first, information is transmitted to the control circuit 1C from the control circuit 6A via the line L1, so that the display device 1A is operated to display this information. Next, information is transmitted to the control circuit 2C from the control circuit 6A via the line L2, so that the display device 2A is operated to display this information.

In this manner, information is first displayed upon the display device 1A by being transmitted thereto via the line L1 which is the one of the transmission lines which has the shorter transmission delay time period, and according to the operation of the control circuit 1C therefor which is the one of the control circuits which has the shorter operating time period; and only subsequently is information displayed upon the display device 2A by being transmitted thereto via the line L2 which is the one of the transmission lines which has the longer transmission delay time period, and according to the operation of the control circuit 2C therefor which is the one of the control circuits which has the longer operating time period; and thereby it is possible to display information quickly upon a plurality of display devices which have control circuits and/or transmission lines of which the operational delay times are different. And the same advantages accrue with this second preferred embodiment of the present invention, as were available with the first preferred embodiment detailed above.

Although the present invention has been shown and described in terms of the above detailed preferred embodiments thereof, it is not to be considered as limited by any of the perhaps quite fortuitous details of those embodiments or of the drawings, but only by the terms of the appended claims, which follow.

We claim:

1. A display system for a camera, comprising:
   a plurality of display devices which mutually differ with regard to their display delay time periods, as taken from when the information which they are to display is input to them until this information is actually displayed by them; and,
   a controller which outputs information to be displayed to said plurality of display devices sequentially in ascending order of their display delay time periods.

2. A display system for a camera according to claim 1, wherein said plurality of display devices includes a display device of an electrical type which has a shorter display delay time period and a display device of a mechanical type which has a longer display delay time period; and,
   said controller outputs information to be displayed to said electrical type display device before it outputs information to be displayed to said mechanical type display device.

3. A display system for a camera according to claim 2, wherein said electrical type display device is a liquid crystal type display device and is provided within a viewfinder of said camera, and said mechanical type display device is a rotating indicator pointer type display device.

4. A display system for a camera, comprising:
   a plurality of display means which mutually differ with regard to their display delay time periods, as taken from when the information which they are to display is input to them until this information is actually displayed by them; and,
   a control means which outputs information to be displayed to said plurality of display means sequentially in ascending order of their display delay time periods.

5. A display system for a camera according to claim 4, wherein said plurality of display means includes a display means of an electrical type which has a shorter display delay time period and a display means of a mechanical type which has a longer display delay time period; and,
   said control means outputs information to be displayed to said electrical type display means before it outputs information to be displayed to said mechanical type display means.

6. A display system for a camera according to claim 5, wherein said electrical type display means is a liquid crystal type display device and is provided within a viewfinder of said camera, and said mechanical type display means is a rotating indicator pointer type display device.

7. A display system for a camera, comprising:
   a plurality of display devices each of which displays a different item of information, and which mutually differ with regard to their display delay time periods as taken from when the information which they are to display is input to them until this information is actually displayed by them; and,
   a controller which outputs said items of information to be displayed to said plurality of display devices sequentially in ascending order of their display delay time periods, said sequential order differing from the time order in which said items of information to be displayed become available.

8. A display system for a camera, comprising:
   a plurality of display means each of which displays a different item of information, and which mutually differ with regard to their display delay time periods as taken from when the information which they are to display is input to them until this information is actually displayed by them; and,
   a control means which outputs said items of information to be displayed to said plurality of display means sequentially in ascending order of their display delay time periods, said sequential order differing from the time order in which said items of information to be displayed become available.

9. A display system for a camera, comprising:
   two display devices, one of which displays exposure information which is calculated based upon the brightness of an object to be photographed which is measured when a shutter release button of said camera is pressed through a first stroke thereof, and the other of which displays photographic distance information detected when said shutter release button is pressed through said first stroke thereof, said two display devices mutually differing with regard to their display delay time periods as taken from when the information which they are to display is input to them until this information is actually displayed by them; and,
   a controller which outputs said exposure information and said photographic distance information to their respective ones of said two display devices, first to the one of said two display devices which has the shorter display delay time period and subsequently to the one of said two display devices which has the longer display delay time period, this output order being the opposite of the time order in which said two items of information become available.

10. A display system for a camera according to claim 9, wherein said display device which displays said photographic distance information is a rotating indicator pointer type display device and is provided upon an upper surface of said camera, and said display device which displays said exposure information is a liquid crystal type display device and is provided within a viewfinder of said camera.

11. A display system for a camera, comprising:
   two display means, one of which displays exposure information which is calculated based upon the brightness of an object to be photographed which is measured when a shutter release member of said camera is pressed through a first stroke thereof, and the other of which displays photographic distance information detected when said shutter release member is pressed through said first stroke thereof, said two display means mutually differing with regard to their display delay time periods as taken from when the information which they are to display is input to them until this information is actually displayed by them; and,
   a control means which outputs said exposure information and said photographic distance information to their respective ones of said two display means, first to the one of said two display means which has the shorter display delay time period and subsequently to the one of said two display means which has the longer display delay time period, this output order being the opposite of the time order in which said two items of information become available.

* * * * *